Figure 1:
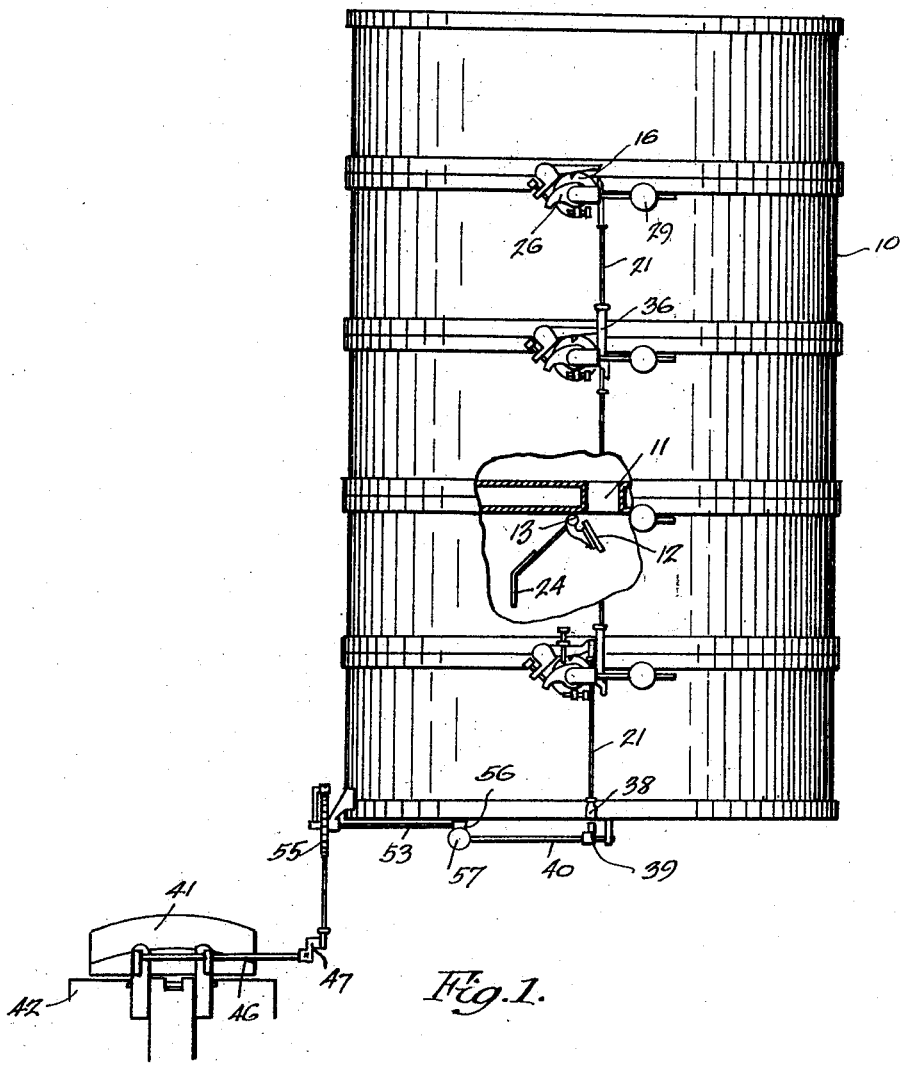

W. B. WARE.
CONTROLLING DEVICE FOR COOKERS.
APPLICATION FILED SEPT. 25, 1920.

1,407,965.

Patented Feb. 28, 1922.
3 SHEETS—SHEET 1.

Inventor,
William B. Ware,
By Thomas R. Harner
Attorney.

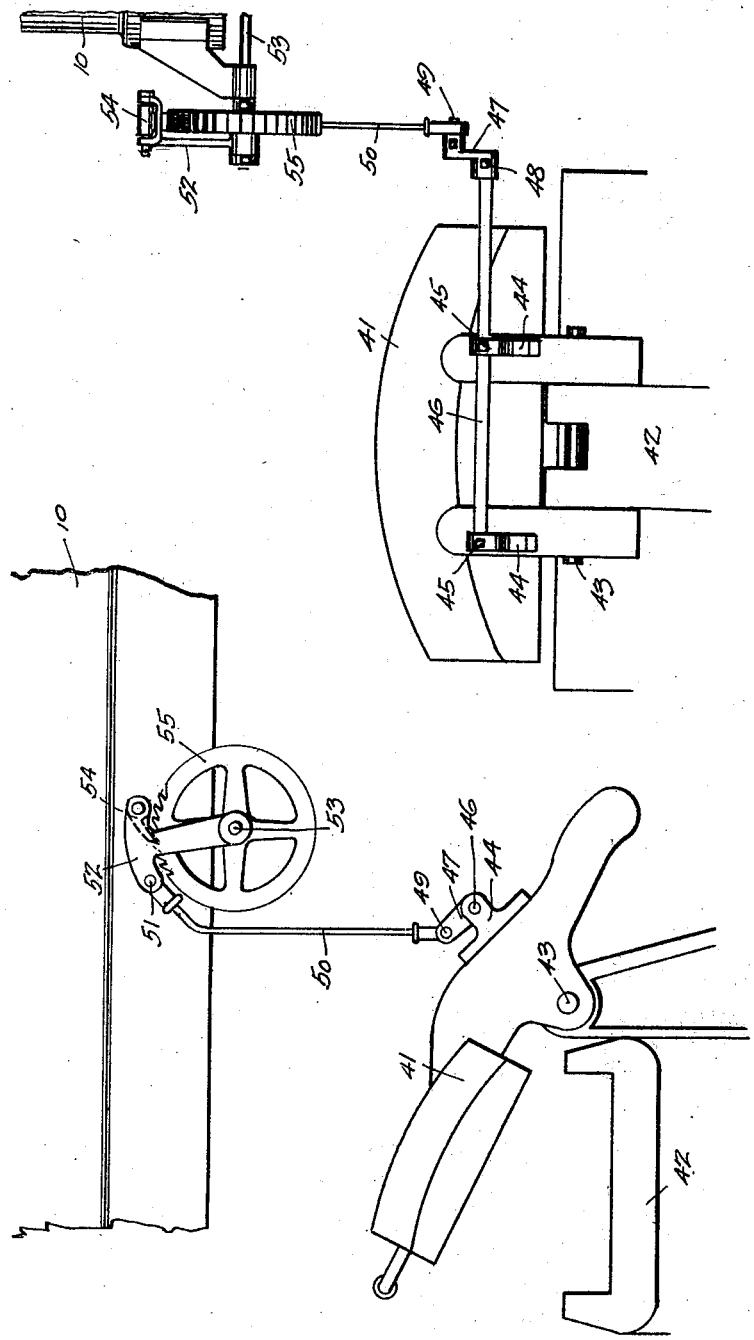

W. B. WARE.
CONTROLLING DEVICE FOR COOKERS.
APPLICATION FILED SEPT. 25, 1920.
1,407,965.
Patented Feb. 28, 1922.
3 SHEETS—SHEET 3.
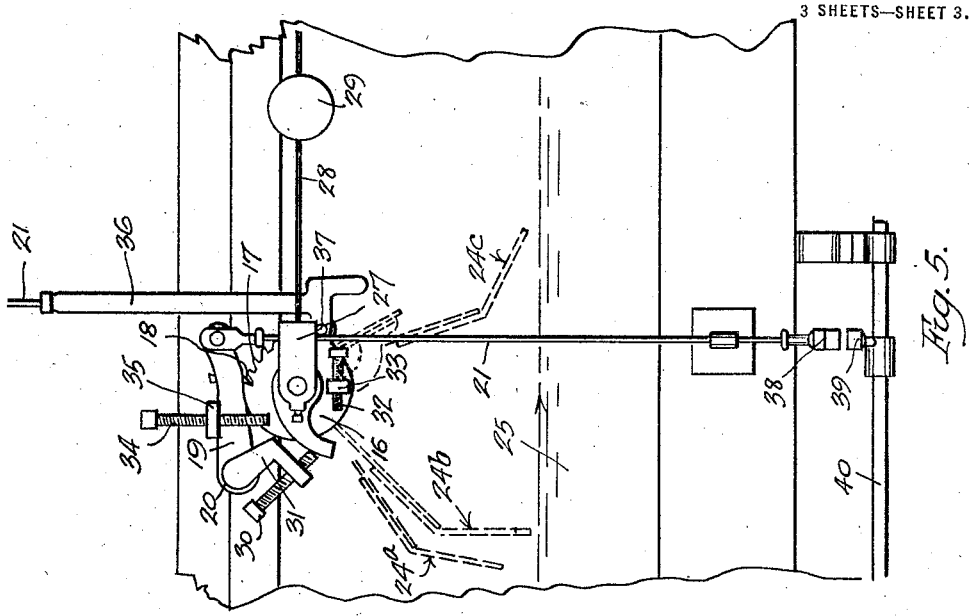
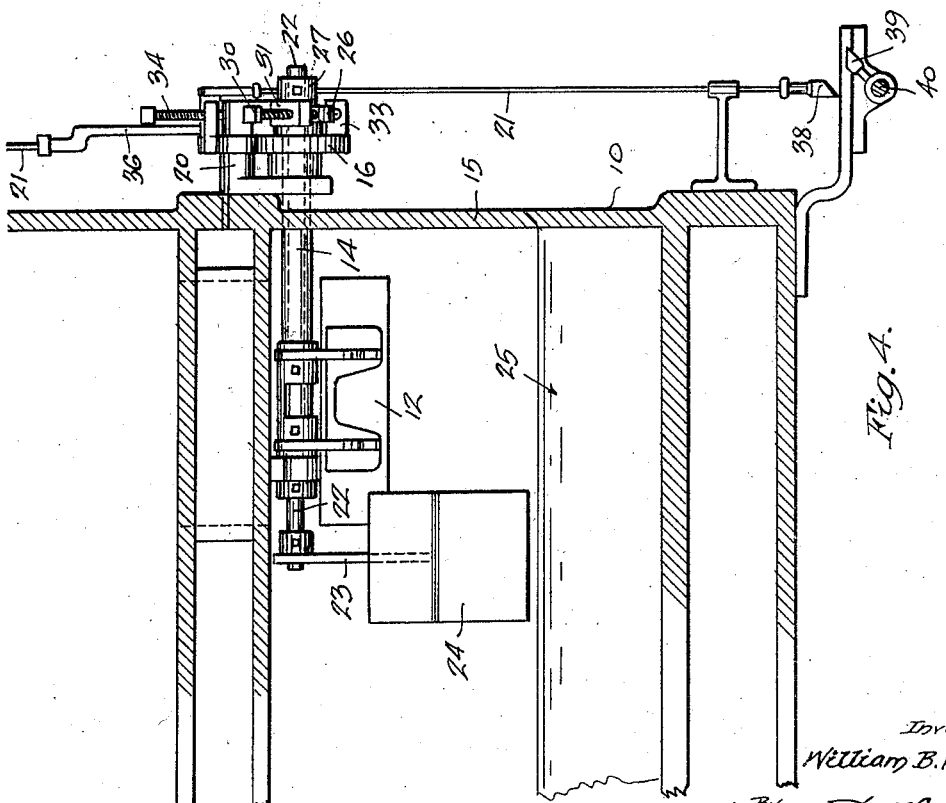
Inventor:
William B. Ware,
By Thomas R. Harner
Attorney.

UNITED STATES PATENT OFFICE.

WILLIAM B. WARE, OF MEMPHIS, TENNESSEE.

CONTROLLING DEVICE FOR COOKERS.

1,407,965.  Specification of Letters Patent.  Patented Feb. 28, 1922.

Application filed September 25, 1920. Serial No. 412,883.

*To all whom it may concern:*

Be it known that I, WILLIAM B. WARE, a citizen of the United States of America, residing at Memphis, in the county of Shelby and State of Tennessee, have invented certain new and useful Improvements in Controlling Devices for Cookers, of which the following is a specification.

My present invention relates generally to the cooking of cotton seeds and the formation of cotton seed meal into cakes, and more particularly to the feed of the meal downwardly by gravity and under automatic control to the lower compartment of a cooker at periods controlled by operation of the cake former and my object is the provision of a mechanism readily adjustable during operation so as to vary the time between periods of controlled operation, as well as the amount of meal which will be dropped within the cooker at each operation.

It is a further object of my invention to provide a simple, strong and durable mechanism of the above general character both as to the means utilized for ready control of the amount of feed of each operation and as to the intervals between operations, and a still further object is the provision of a mechanism in which the gate returning or closing means will be actuated by the circulating seed meal in the cooker, without causing unnecessary or undesirable drag against such circulation.

In general the mechanism utilized by my invention for the purpose of carrying out these and other objects to be hereinafter made plain includes an apparatus wherein a movable cake former head is provided with readily adjustable means, exposed at all times, for controlling and constituting a trip mechanism whose purpose is to intermittently release a feed gate normally closing the upper intake opening of the lower compartment of a cooker from which the meal is withdrawn into the cake former. The mechanism also includes a weight arm, together with readily adjustable means, exposed at all times, for adjustment during operation, whereby the feed gate will be automatically returned to closed and locked position when the desired quantity of meal has fallen into the lower compartment of the cooker, the adjustment in this latter instance controlling the amount of meal fed in this way.

In the accompanying drawings which show the preferred embodiment of my invention and which form a part of this specification, Figure 1 is an elevation, partly broken away, showing portions of a cooker and a cake former, with the feed controlling connections as proposed by my invention therebetween and in connection therewith, Figure 2 is an enlarged end view of portions of the cake former and its trip actuating means, Figure 3 is a rear view thereof, Figure 4 is an enlarged vertical section through the lower portion of the cooker, and Figure 5 is a side view of the lower portion of the cooker.

Referring now to these figures and particularly to Figures 1, 4 and 5, I have shown in Figure 1 a five compartment feed cooker generally indicated at 10, each compartment of which opens into the next lowermost compartment in order to promote of a gravity feed between the compartments, through a feed channel 11, each feed channel being controlled by a vertically swinging feed gate 12, pivotally mounted within the compartment below the respective channel 11 upwardly against which the feed gate 12 is normally held in closed and locked position and by the means to be presently described.

In the usual cooker of this type means are utilized in each cooking compartment to bring about rotating movement of the meal at all times, usually radial stirring arms on a vertical shaft through the cooker, which I have not shown on account of the fact that these parts are well known and understood and form no part of my present invention.

The pivot 13 of the feed gate 12 as seen in Figure 1 is formed by a hollow shaft 14 as seen clearly in Figure 4, upon the inner portion of which the feed gate is secured in a position at one side of the vertical axis of the cooker, with its outer end extending through and beyond the surrounding wall 15 of the cooker. Upon the outer end of the hollow shaft 14 is secured a wheel 16 having ratchet teeth 17 for a portion of its periphery, engaged by the single tooth 18 of a dog 19, pivoted at one end upon a rigid outstanding stud 20. This ratchet wheel 16 oscillates in the swinging movement of the respective gate 12 from the open or feed position shown in Figure 1 to the closed position against the lower surrounding edge of the respective feed channel 11. The free end of the dog, which latter is normally engaged with the teeth 17 of the ratchet wheel 16 to hold the feed gate in closed position, is pivotally connected to the upper end of a trip rod 21, and upward movement of this trip rod shifts the dog 19 vertically so as to release the ratchet wheel 16, permitting the feed gate 12 to drop and thus allow of a gravity feed downwardly into the respective cooker compartment.

Through the hollow shaft 14 is journaled a shaft 22, and upon the inner end of this shaft 22 beyond the inner end of the hollow shaft 14 and consequently within the respective cooker compartment is securely fastened a paddle supporting arm 23 carrying, in accordance with my invention, an angular paddle 24 capable of gradually falling with the fall of the level of meal 25 within the compartment. The outer end of shaft 22 projects beyond the outer end of the hollow shaft 14 and is provided with a rigid angular arm 26 extending in one direction and a rigid weight supporting arm 27 and rod 28 projecting in the opposite direction, the rod 28 carrying an adjustable weight 29 whose pressure is just sufficient to lower the paddle 24 with the fall of the level of the seed meal without causing undesirable drag of the paddle against the meal which as well known travels or circulates around the space within the respective cooker compartment.

Downward swinging movement of the paddle 24 is limited by engagement of its arm 26 with an adjustable stop in the nature of a set screw 30 threaded through a rigid angular extension 31 at the free end of the pivot post 20 before described, and it is thus obvious that the particular relationship between the paddle 24 and the surface of the meal within the cooker compartment may be varied by adjusting the set screw 30, as indicated by the two dotted line positions 24$^a$ and 24$^b$ of the paddle in Figure 5. This adjustment brings about more or less spacing between the lower edge of the paddle in its lowermost position and the base of the compartment so that more or less of a level of meal will be necessary in order that the meal may engage the lower edge of the paddle and swing the same forwardly and upwardly toward the dotted line position 24$^c$ of Figure 5.

When the meal thus engages and shifts the paddle, upon the dropping of a fresh supply of meal from the next compartment thereabove through the feed channel, with the gate in lowered position, the arm 26 of shaft 22 is shifted away from the stop screw 30 and toward and into engagement with a set screw 32 adjustably threaded through a bracket or bearing 33 outstanding from the ratchet wheel 16 so that the ratchet wheel will be shifted, causing similar movement of the hollow shaft 14, to swing the feed gate 12 upwardly to closed position, and it is obvious that by adjusting the set screw 32, the stroke or extent of movement of the feed gate will be controlled in order to effectively bring the same into closed position at the end of operative movement of the paddle 24 under the effect of the circulating meal.

In Figures 1, 4 and 5 I have shown a third set screw 34 threaded vertically through a bracket 35 of the ratchet wheel controlling dog 19 and by adjusting this set screw 34 so as to be engageable by the arm 26 of shaft 22 it is obvious that the paddle 24 in its lowering movement will lift and free the dog 19 from ratchet wheel 16 so as to permit the feed gate 12 to lower to open position, this movement being followed by the before described operation of closing the feed gate 12 when the level of meal in the respective compartment has been increased to the desired point by the fall of meal from the next compartment thereabove.

By virtue of the set screw 34 it thus becomes obvious the operation can be carried out automatically without reference or control by a meal cake former, and the operation similarly carried through the upper compartments. On the other hand by providing each trip rod 21 above the lower compartment of the cooker with actuating means at its upper end similar to wipers 38 and 39 and with an actuating bar 36 into the upper end of which the lower end of the rod telescopes, I provide for successive operation of each of the several compartments, each bar 36 being pivotally connected at its lower end at 37 to the ratchet wheel 16 of the next lowermost compartment.

In further accordance with my invention however I propose to provide the lower end of the trip rod 21 of the lowermost compartment of the cooker with a wiper 38 whose angular lower surface is engageable by the similar upper surface of a wiper 39 secured upon a shaft 40 journaled at one lower side of the cooker. This shaft 40 forms a part of the trip mechanism proposed by my invention, leading from and actuated by the movable head 41 of a cake former generally indicated at 42 in Figures 1, 2 and 3. The head 41 is shown as movable upon a pivot 43 as is common at the present time and is provided in accordance with my invention with a pair of brackets 44 rigidly secured thereto and rigidly holding by means of set screws 45, a shaft 46 one portion of which projects laterally to one side of the head 41 and has an end crank arm 47 adjustably secured thereto by a set screw 48 and provided with an offset crank pin 49 whose axis is parallel to that of the pivot 43 of the former head 41 and is capable of adjustment toward and away from the pivot 43. This is accomplished by releasing set screw 48 and shifting the crank 47 on the shaft end and the result is thus to vary the arc of movement of the crank pin 49 when the former head 41 is raised and lowered. The crank pin 49 engages one end of a connecting rod 50 whose upper opposite end is pivotally connected at 51 with a pawl carrying arm 52 journaled on a shaft 53 and having a pawl 54 engaging the toothed periphery of a ratchet wheel 55 secured on shaft 53. Shaft 53 has at its opposite end a worm 56 engaging a worm wheel 57 as seen in Figure 1, which worm wheel is geared in any suitable manner for a right angle drive to the shaft 40 before described so that the ratio of rotation is reduced as between shafts 53 and 40, and the latter is at the same time prevented from independent rotation.

It is thus obvious that at periods during operation of the cake former rotation of shaft 40 will shift the wiper 39 into engagement with the wiper 38 and will lift the latter and consequently shift the trip rod 21 vertically as the wiper 39 moves beneath the wiper 38, thus lifting the dog 19 free of the ratchet wheel 16 to permit of lowering movement of the feed gate 12 as previously described, and it is also obvious that by adjusting the crank 47 in the manner previously described the stroke of movement imparted to the ratchet wheel 55 upon each lowering movement of the former head 41 will be varied so as to thus vary the intervals between engagement of the wipers 39 and 38 and in this way vary intervals between lowering movements of the feed gate to open position.

It is likewise obvious the above operation takes place in the several compartments filled with meal rotating as a mass in each compartment. The meal gradually cooks and descends from one compartment to another, and the cooking operation is finished when it is finally taken from the lower compartment of the cooker into the cake former. Through the connections previously described, and upon the discharge of a certain amount of meal from the lower compartment, the several other compartments discharge in turn, each into the next lowermost compartment according to the operation above set forth, making place for the supply of meal into the upper compartment.

It thus becomes apparent that my invention provides for the carrying out of the foregoing objects and the desired functions in a simple effective manner and by virtue of inexpensive connections and parts whose points of adjustment for the various purposes stated are fully exposed at all times for manipulation during operation and without necessitating a shut down of the cooker.

I claim:

1. A trip actuating means for seed cookers, including a two-part trip shaft, gearing between and connecting said shaft parts, ratchet means for intermittently rotating one of said shaft parts, a cake former having a pivoted movable head, and means on said head for actuating said ratchet means.

2. A trip actuating means for seed cookers, including a two-part trip shaft, gearing between and connecting said shaft parts, ratchet means for intermittently rotating one of said shaft parts, a cake former having a pivoted movable head, and means on said head for actuating said ratchet means, including connections whereby to vary the extent of such actuation.

3. A trip actuating means for seed cookers, including a two-part trip shaft, gearing between and connecting said shaft parts, ratchet means for intermittently rotating one of said shaft parts, a cake former having a pivoted movable head, and means on said head for actuating said ratchet means, including connections adjustable with respect to the pivot of the head whereby to vary the extent of such actuation.

4. A trip actuating means for seed cookers, including a two-part trip shaft, gearing between and connecting said shaft parts, ratchet means for intermittently rotating one of said shaft parts, a cake former having a pivoted movable head, a rod secured to and outstanding from the said head, and a member having a pivot connection with said ratchet means, and adjustably mounted on said rod to shift said pivot connection toward and away from the pivot of the head.

5. A trip actuating means for seed cookers, including a trip shaft, ratchet means on the shaft, a cake former having a pivoted movable head, a shaft secured on the head, a crank having a pivot pin parallel to the pivot of the head and adjustably mounted on said shaft to shift its pivot pin toward and away from the pivot of the head, and a connecting rod extending from the said ratchet means and engaged by the said pivot pin.

In testimony whereof I have affixed my signature.

WILLIAM B. WARE.